United States Patent
Borchert et al.

(10) Patent No.: US 7,861,885 B2
(45) Date of Patent: Jan. 4, 2011

(54) FUEL TANK OF THERMOPLASTIC MATERIAL WITH FUNCTIONAL INSTALLATION FITMENTS FOR AIR INTAKE AND VENTING, FOR FUEL TAKE-OFF OR THE LIKE

(75) Inventors: Matthias Borchert, Bonn (DE); Gerd Wolter, Konigswinter (DE); Harald Lorenz, Bad Neuenahr-Ahrweiler (DE); Dirk Eulitz, Bonn (DE); Timo Kramer, Hirz-Maulsbach (DE); Klaus Gebert, Willich (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 396 days.

(21) Appl. No.: 11/957,792

(22) Filed: Dec. 17, 2007

(65) Prior Publication Data

US 2008/0149642 A1   Jun. 26, 2008

Related U.S. Application Data

(60) Provisional application No. 60/870,231, filed on Dec. 15, 2006.

(51) Int. Cl.
  *B65D 88/12*   (2006.01)
  *B65D 6/00*   (2006.01)
  *B65D 8/00*   (2006.01)
(52) U.S. Cl. .................. 220/562; 220/4.13; 220/4.14
(58) Field of Classification Search .......... 220/4.13, 220/4.14, 529, 530, 562, 563
  See application file for complete search history.

(56) References Cited

U.S. PATENT DOCUMENTS

| | | | |
|---|---|---|---|
| 3,219,742 A | * | 11/1965 | Reinert ................ 264/248 |
| 5,346,092 A | | 9/1994 | Gerhard |
| 6,260,542 B1 | | 7/2001 | Kochsmeier |
| 6,588,970 B1 | | 7/2003 | Natrop |

FOREIGN PATENT DOCUMENTS

| | | |
|---|---|---|
| DE | 1704387 A1 | 1/1972 |
| DE | 3612194 | 10/1986 |
| DE | 19909041 A1 | 9/2000 |
| DE | 10328206 A1 | 1/2005 |

OTHER PUBLICATIONS

International Search Report received in related International Patent Application No. PCT/EP2007/010068 dated Feb. 28, 2008. 6 pages.
International Preliminary Report on Patentability and Written Opinion dated Dec. 15, 2006 in International Patent Application No. PCT/EP2007/010068.

* cited by examiner

*Primary Examiner*—Harry A Grosso
(74) *Attorney, Agent, or Firm*—Grossman Tucker Perreault & Pfleger, PLLC

(57) ABSTRACT

The invention concerns a fuel tank (1) of thermoplastic material, comprising functional installation fitments for air intake and venting, for fuel take-off or the like, which is distinguished in that at least one functional installation fitment is connected to the inside wall (3) of the container in material-bonded relationship in such a way that the functional installation fitment defines with the container wall a volume separated from the filling volume of the container in such a way that the inside wall (3) of the container serves directly as a boundary wall of said volume.

7 Claims, 3 Drawing Sheets

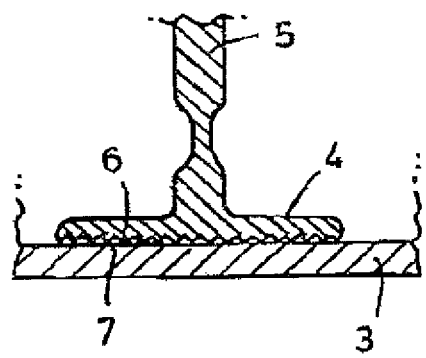
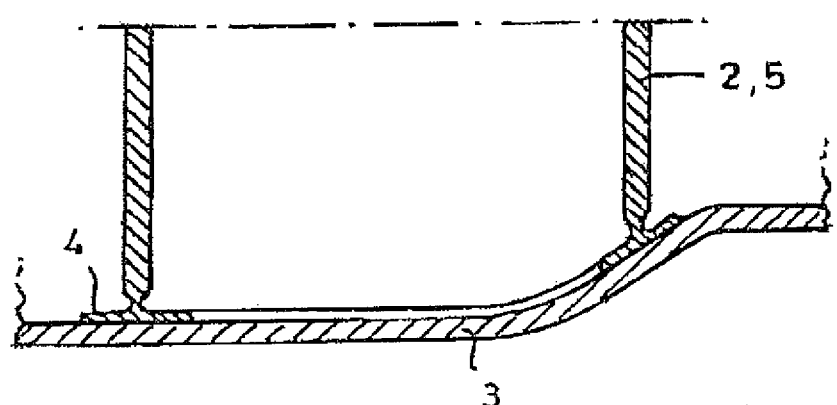

FUEL TANK OF THERMOPLASTIC MATERIAL WITH FUNCTIONAL INSTALLATION FITMENTS FOR AIR INTAKE AND VENTING, FOR FUEL TAKE-OFF OR THE LIKE

CROSS-REFERENCE TO RELATED APPLICATIONS

This application claims the benefit of U.S. Provisional Application 60/870,231 filed Dec. 15, 2006.

FIELD

The invention concerns a fuel tank of thermoplastic material with functional installation fitments for air intake and venting, for fuel take-off or the like.

BACKGROUND

The invention concerns in particular an extrusion blow molded fuel tank of thermoplastic material. Such tanks are usually produced in one piece from one or more tubular preforms which are applied against the wall of a multi-part molding tool by means of gas pressure or are expanded in the tool. Depending on how the operation of shaping the tank in the tool is effected, installation fitments are introduced into the tank either after it is finished through one or more mounting openings and fixed therein or the functional components are already introduced into the tank during the operation of shaping it. If the tank is blow molded from a tubular preform, the diameter of the preform is generally such that it can be extruded over an installation fitment holder with installation fitments carried thereon.

Welding installation fitments to the inside wall of the tank in the first heat when shaping the tank has proven to be disadvantageous in particular when dealing with relatively large installation fitments such as surge containers or the like as cooling of the container wall after the article is finished is impeded in the regions in which weld surfaces are provided on the inside wall of the container. If for example in the fuel tank a surge container is welded with its bottom support surface over a large area to the inside wall of the fuel tank, cooling of the tank wall when cooling down the article is hindered over a large area. In particular internal cooling of the finished article by gas/air flushing is adversely effected. The accumulation of material at the inside wall of the container, being greater in region-wise manner, possibly causes shrinkage distortion of the material which is visible externally on the tank.

In principle however, for reasons of production engineering simplification, it would be desirable to provide one-piece tanks made from thermoplastic material, which are equipped with installation fitments or installation components which are joined to the tank wall in manufacture in the first heat.

Therefore the object of the invention is to provide a fuel tank of thermoplastic material having functional installation fitments for air intake and venting, for fuel take-off or the like, in which the functional components are connected to the container wall and in which the functional components were connected to the tank during shaping thereof in the first heat, the aim being that the tank should not involve the above-mentioned disadvantages.

That object is attained by a fuel tank of thermoplastic material of the kind set forth in the opening part of this specification, which is distinguished in that at least one functional installation fitment is connected to the inside wall of the container in material-bonded relationship in such a way that the functional component defines with the container wall a volume separated from the filling volume of the container in such a way that the inside wall of the container serves directly as a boundary wall of said volume.

SUMMARY

The invention can be summarised to the effect that there are introduced into the fuel tank those functional components which acquire full functionality only in a condition of co-operation with the inside wall of the container, so that the inside wall of the container takes over a part of the functionality of the component in question and also acts as a boundary wall of the functional component. As functional installation fitments, it is possible to provide for example profile portions which are welded to the inside wall of the container in such a way that, with the inside wall of the container, they form volumes or passages which are closed at least in portion-wise manner.

By way of example the profile portions can be of semicircular, U-shaped or V-shaped configuration in cross-section.

In a particularly preferred variant of the invention there is provided at least one surge container for a fuel pump, which surge container is open on its side towards the inside wall of the tank in the installation position and the boundary wall thereof being connected therearound to the inside wall of the tank in material-bonded relationship. That eliminates an accumulation of material at the inside wall of the tank, which occurs by virtue of the bottom of the surge container bearing over its full surface area against the inside wall of the fuel tank. In the variant according to the invention the fuel tank itself forms the bottom of the surge container. In that way it is advantageously possible to use a surge container which is at least partially closed on its side remote from the inside wall of the tank. Such a surge container can be for example in the form of a plastic component produced in one piece by injection molding. The possibility of being able to produce the surge container as an integral component or in one piece is afforded in particular by virtue of the fact that the surge container is closed by the wall of the fuel tank upon being mounted or connected to the inside wall of the fuel tank.

It will be appreciated that the fact that the side of the surge container that is remote from the inside wall of the tank is to be of a closed configuration is to be interpreted as meaning that the surge container can have connections, nipples or apertures for lines which are to pass into or out of the surge container.

Desirably the boundary wall of the surge container is provided with a peripherally extending fixing flange at the side that is towards the inside wall of the tank in the installation position.

In order to achieve a peripherally extending connection which is as good as possible, involving a material-bonded relationship, between the fixing flange on the one hand and the inside wall of the tank on the other hand, the joining surface of the fixing flange can be of a profiled configuration. Alternatively the joining surface of the fixing flange can be provided with melting projections and/or melting extension portions. That is used to denote thin material projections or material extension portions, ribs or limbs which have a comparatively slight thermal capacity and which, when the parts in question of the joining surface come into contact with the inside wall of the tank which is still hot, melt because of their slight thermal capacity and thus contribute to forming a reliable welded connection.

The boundary wall of the surge container can be of a flexible nature at least in region-wise manner and at least portion-wise in relation to the periphery of the surge container. By way of example the boundary wall of the surge container may have a peripherally extending film hinge or the like so that the angle between the fixing flange and the container wall is variable. It is thus possible advantageously to compensate for unevenness and irregularities in the inside wall of the tank. As is known, components which are just extrusion blow molded involve slight tolerances in respect of wall thickness, which are to be taken into consideration when designing installation fitments to be welded to the tank wall, at least in relation to those installation fitments which must be welded peripherally in sealing relationship with the inside wall of the tank, as must be the case for example with a surge container.

If profile portions for forming passages or receiving means for lines are to be provided as the installation fitment, it is possible for those installation fitments to be so designed overall in terms of their wall thickness that tolerances in wall thickness of the inside wall of the tank can be compensated for, when joining the installation fitments.

DESCRIPTION OF THE DRAWINGS

The invention is described hereinafter by means of an embodiment by way of example which is illustrated in the drawing in which:

FIG. 6 shows a fifth embodiment according to the invention, FIG. 7 shows a sixth embodiment according to the invention, FIG. 8 shows a partial section through the surge container of the fuel tank according to the invention, in which a non-flat support and fixing surface on the inside wall of the container is shown on an exaggerated scale.

DETAILED DESCRIPTION

Figure 1:
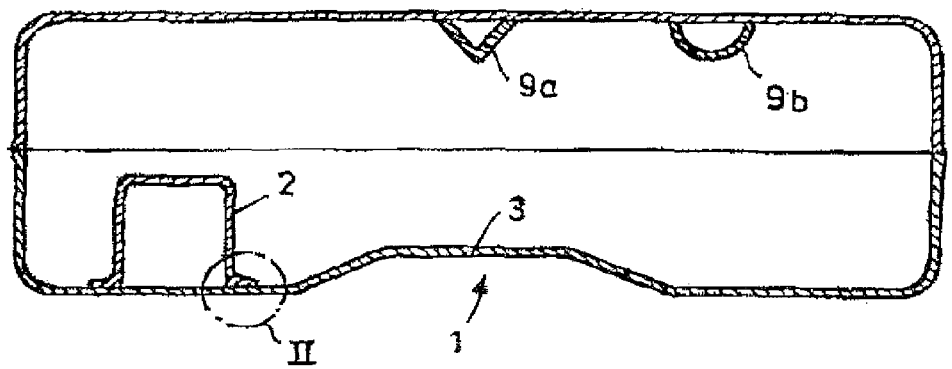
FIG. 1 shows a view in section through a fuel tank according to the invention.
Figure 2:
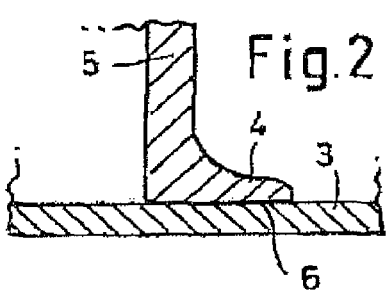
FIG. 2 shows an enlarged sectional view of the detail II in FIG. 1.
Figure 3:
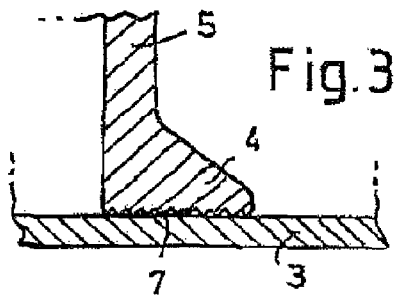
FIG. 3 shows an alternative configuration of the fixing flange shown in FIG. 2 of the surge container fixed in the fuel tank.
Figure 4:
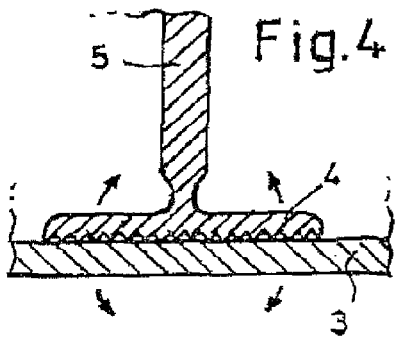
FIG. 4 shows a further configuration of the surge container in the region of its fixing to the inside wall of the tank.
Figure 5:
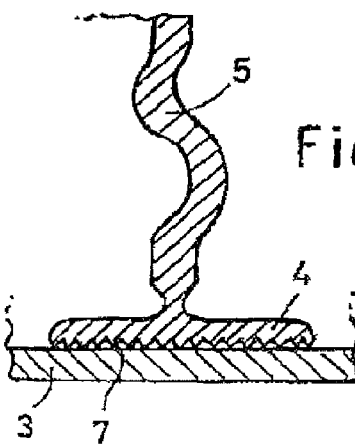
FIG. 5 shows a fourth variant of the surge container in the region of its fixing to the inside wall of the fuel tank.

FIG. 1 shows a simplified sectional view of a fuel tank 1 according to the invention. The fuel tank 1 is in the form of an extrusion blow molded plastic hollow body. It was produced by extrusion blowing of an overall six-layer co-extrudate of thermoplastic material with at least one barrier layer for hydrocarbons. In that case, two preforms in web form of thermoplastic material were extruded between the opened parts of a blow molding tool having a total of three parts. The blow molding tool for the production of such a fuel tank 1 includes at least two outer molds and a central mold, wherein each of the outer molds forms a cavity portion which defines a respective half of the hollow body to be produced. In a first step in the method the respective preforms in web form are extruded or arranged between an outer mold and the central mold respectively. In that position the outer molds are closed against the central mold. That results in the formation of a closed mold cavity, wherein the preforms are each drawn into the respective cavity portion at the respective outer mold by means of gas pressurisation of the central mold and/or evacuation of the outer molds. Component carriers with components disposed thereon are preferably provided in the central mold on a displaceable frame. The component carriers are arranged displaceably in the central mold by way of for example hydraulically or pneumatically actuable cylinders. By means of the component carriers functional components are placed within the tank in such a way that they are fitted for example into suitable receiving means at the inside wall of the tank.

Alternatively it is possible in that way for functional components of plastic material to be welded to the inside wall of the tank, while that wall is still plastic, during the operation of shaping the tank.

It will be appreciated that a fuel tank as is described in detail hereinafter can also be obtained by deep drawing or thermoforming, in which respect also functional components can be welded to the inside wall of the tank in such a process.

The container shown in FIG. 1 is in the form of a fuel tank 1. The principle described herein can however be readily applied to other closed containers of plastic material with functional components to be provided therein.

The fuel tank 1 is shown in greatly simplified form. It may include the usual air intake and venting lines as well as at least one filling connection and lines for fuel take-off to an internal combustion engine of a motor vehicle (not shown). Usually the fuel is conveyed by way of a plurality of suction jet pumps from various sub-volumes of the fuel tank 1 which is shown here for reasons of simplification only with one single volume into a surge container 2 which is arranged in the fuel tank 1. Arranged in known manner within the surge container 2 which is also referred to as a roll pot is at least one electric fuel delivery pump which conveys fuel from the volume of the surge container to the engine of the internal combustion machine. The fuel pump is also not shown here for reasons of simplification. The surge container 2 serves to ensure that the fuel pump is supplied with fuel during all travel conditions of the vehicle, that is to say in acceleration, deceleration and when negotiating bends.

In accordance with the invention it is provided that for example the surge container 2 is connected to the inside wall 3 of the fuel tank 1 in such a way that it defines a volume which is separate from the filling volume of the fuel tank 1, wherein the inside wall 3 of the container serves directly as the boundary wall of the volume. In other words, the surge container 2 in the embodiment described here does not have a bottom. The bottom is formed by the inside wall 3 of the fuel tank 1, wherein the surge container 2 is provided on its side towards the inside wall 3 with a fixing flange 4 which is peripherally welded in sealing relationship to the inside wall 3 of the fuel tank 1. That makes it possible for the surge container 2 to be in the form of a one-piece injection-molded component on which all essential elements are molded. In the case of a conventionally designed surge container 2 with a bottom, it is necessary for it possibly to be provided with a cover fastener which is then latched to the surge container 2. That is necessary in order to pre-assemble the fuel pump and possibly a fuel level sender or the like in the surge container 2 before it is introduced into the fuel tank 1.

According to the invention it is provided that the surge container 2 may be connected to the inside wall 3 in material-bonded relationship therewith during the procedure for shaping the fuel tank 1. More specifically, as already mentioned in the opening part of this specification, this may be done in such a way that the inside wall 3 forms a boundary wall of the surge container 2.

As can be seen from FIGS. 2 through 7, the boundary wall 5 of the surge container 2 in the region of the fixing flange 4 can be of an L- or T-shaped profile with a joining surface 6 which faces towards the inside wall 3. In the case of the surge container 2 which is desirably of a round configuration in cross-section, the joining surface 6 of the fixing flange 4 is of a fully peripherally extending configuration so that it can be welded at the edge side in sealing relationship to the inside wall 3 of the fuel tank 1.

For that purpose the joining surface 6 is provided with welding ribs or welding protrusions 7 (See FIGS. 3-6) whose thermal capacity is such that, upon coming into contact with the wall 3 of the fuel tank 1 when it is still hot and plastic during the procedure for shaping the fuel tank, the ribs or protrusions 7 melt and thus form an intimate material-bonded connection between the inside wall 3 on the one hand and the joining surface 6 on the other hand.

In order to be able to compensate for wall thickness tolerances in the container wall or indeed unevenness and irregularities of the inside wall, the boundary wall 5 may be of a flexible configuration, as shown in FIGS. 4 through 8, in such a way that the fixing flange 4 may be flexible or movable within certain limits and can assume for example the angled (not right-angled) position with respect to the boundary wall 5 of the surge container 2, which is shown in FIG. 8 on the right-hand side. The flexibility of the fixing flange 4 in relation to the boundary wall 5 can be achieved in various ways, for example by the provision of a peripherally extending film hinge having a curved (FIG. 5) or thinned (FIGS. 4, 6 and 8-12) cross-section. Alternatively, the surge container can have been produced from various plastic materials, in which case for example plastic materials of varying hardness can be provided over the height of the boundary wall 5 (hard-soft-hard for example). That may permit height compensation in respect of any projections in the inside wall 3 of the fuel tank 1. Depending on the respective width and configuration of the fixing flange 4 load relief slots can be provided therein to avoid unacceptable stresses, caused by the circular ring shape of the joining surface 6.

The invention has been described hereinbefore with reference to a surge container 2.

As is also shown in FIG. 1, it is also possible to provide profile portions 9 as installation fitments in accordance with the invention. The profile portions 9 were welded to the inside wall 3 of the fuel tank 1 during the shaping thereof, in such a way that they form either closed passages for air and/or fuel or for receiving lines which are of round cross-section. In the latter case the profile portions 9a, b embrace and hold lines accommodated therein, only in region-wise manner.

The profile portion 9a shown in FIG. 1 is of a V-shaped cross-section while the profile portion identified at 9b in FIG. 1 is in the form of a U-shaped cross-section. Other geometries are readily conceivable within the scope of the invention. The profile portions 9a, b make use of the underlying idea of the invention, of using the inside wall 3 of the container as a boundary wall of a volume to be separated from the container. That saves on clamping or latching retaining fixings for lines.

Figure 9:
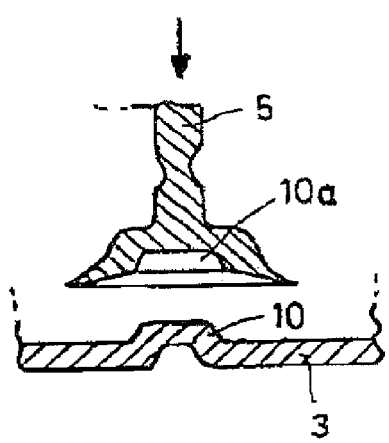
FIGS. 9 and 10 show a seventh embodiment according to the invention.
Figure 10:
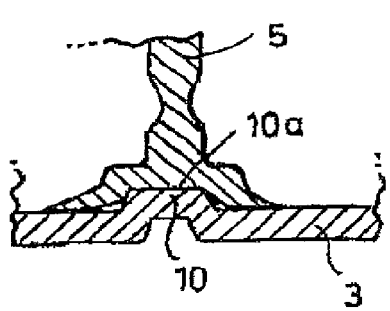

As shown in FIGS. 9 and 10, the inside wall 3 of the fuel tank can be provided with inwardly projecting ribs 10 or the like, which co-operate with corresponding grooves 10a of the surge container 2 and which facilitate immovable fixing thereof on the inside wall 3 of the fuel tank 1.

It will be appreciated that, instead of the ribs 10 on the inside wall 3 of the fuel tank 1, it is also possible to provide there grooves which co-operate with corresponding ribs on the surge container 2.

Figure 11:
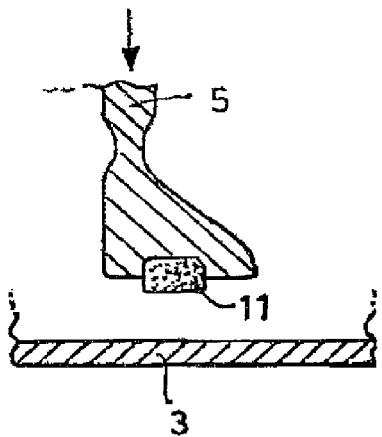
FIGS. 11 and 12 show an eighth embodiment according to the invention.
Figure 12:
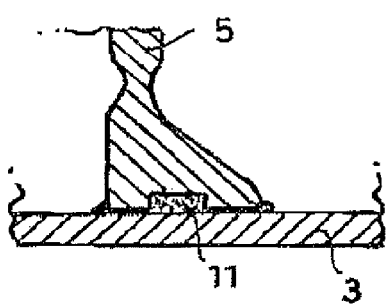

FIGS. 11 and 12 show a variant of the surge container which comprises a plastic material which is not compatible with the inside wall 3 of the fuel tank 1, in the sense of being weldable thereto. In that case, provided between the joining surface 6 of the boundary wall 5 and the inside wall 3 of the fuel tank 1 is a hot melt adhesive 11 or another suitable bonding agent which in contact with the hot inside wall 3 of the fuel tank 1 produces a connection involving a material-bonded relationship.

LIST OF REFERENCES 1 fuel tank
2 surge container
3 inside wall
4 fixing flange
5 boundary wall
6 joining surface
7 welding protrusions
8 relief slots
9a, b profile portions
10 ribs
10a grooves
11 hot melt adhesive

The invention claimed is:

1. A container, in particular a fuel tank of thermoplastic material having an inside wall and a filling volume, including functional installation fitments for air intake and venting and for fuel take-off, characterised in that at least one functional installation fitment is connected to an inside wall of the container in material-bonded relationship in such a way that the functional installation fitment defines with the container wall a volume separated from the filling volume of the container in such a way that the inside wall of the container serves directly as a boundary wall of said volume, characterised in that there is provided at least one surge container for a fuel pump, wherein said surge container includes a boundary wall and at least one side and is open on the side that in the installation position faces towards the inside wall of the container and said boundary wall is peripherally connected in material-bonded relationship to the inside wall of the container, characterised in that the boundary wall of the surge container has a peripherally extending fixing flange at the side facing towards the inside wall of the container in the installation position, and characterised in that the boundary wall of the surge container is flexible at least in region-wise manner and at least portion-wise with respect to the periphery of the surge container.

2. A container as set forth in claim 1 characterised in that profile portions are provided as functional installation fitments, being welded to the inside wall of the container in such a way that they form volumes or passages which are closed at least in portion-wise manner therewith.

3. A container as set forth in claim 2 characterised in that the profile portions are of semicircular, U-shaped or V-shaped cross-section.

4. A container as set forth in claim 1 characterised in that the surge container is at least partially closed on its side remote from the inside wall of the container.

5. A container as set forth in claim 1 characterised in that the joining surface of the fixing flange is profiled.

6. A container as set forth in claim 5 characterised in that the joining surface of the fixing flange is provided with melting projections and/or melting extension portions.

7. A container as set forth in claim 1 characterised in that the angle between the fixing flange and the boundary wall is variable.

* * * * *